United States Patent [19]
Hultgren

[11] Patent Number: 6,134,589
[45] Date of Patent: Oct. 17, 2000

[54] DYNAMIC QUALITY CONTROL NETWORK ROUTING

[75] Inventor: Anders Hultgren, Danderyd, Sweden

[73] Assignee: Telefonaktiebolaget LM Ericsson, Stockholm, Sweden

[21] Appl. No.: 09/073,833

[22] Filed: May 6, 1998

Related U.S. Application Data

[60] Provisional application No. 60/049,778, Jun. 16, 1997.

[51] Int. Cl.[7] .................................................. G06F 15/16
[52] U.S. Cl. .................... 709/227; 709/238; 709/239; 370/351
[58] Field of Search ................................... 709/227, 238, 709/239; 370/351, 360

[56] References Cited

U.S. PATENT DOCUMENTS

| | | |
|---|---|---|
| 4,756,019 | 7/1988 | Szybicki . |
| 5,029,164 | 7/1991 | Goldstein et al. . |
| 5,065,392 | 11/1991 | Sibbitt et al. ............................ 370/58.2 |
| 5,065,393 | 11/1991 | Sibbitt et al. ............................ 370/58.2 |
| 5,313,467 | 5/1994 | Varghese et al. . |
| 5,359,508 | 10/1994 | Rossides . |
| 5,359,593 | 10/1994 | Derby et al. ............................... 370/17 |
| 5,388,097 | 2/1995 | Baugher et al. . |
| 5,408,465 | 4/1995 | Gusella et al. . |
| 5,479,404 | 12/1995 | Francois et al. . |
| 5,485,455 | 1/1996 | Dobbins et al. . |
| 5,517,620 | 5/1996 | Hashimoto et al. . |
| 5,526,350 | 6/1996 | Gittins et al. . |
| 5,546,379 | 8/1996 | Thaweethai et al. . |
| 5,557,320 | 9/1996 | Krebs . |
| 5,559,798 | 9/1996 | Clarkson et al. . |
| 5,640,569 | 6/1997 | Miller et al. ............................. 395/729 |
| 5,778,187 | 7/1998 | Monteiro et al. ........................ 709/231 |
| 5,781,534 | 7/1998 | Perlman et al. ......................... 370/248 |

FOREIGN PATENT DOCUMENTS

| | | |
|---|---|---|
| 0 386 659 A2 | 12/1990 | European Pat. Off. . |
| 0 753 952 A2 | 1/1997 | European Pat. Off. . |
| 2 697 358 A1 | 4/1994 | France . |

OTHER PUBLICATIONS

La Roche, et al, "High–Speed Data Services Using the Switched Digital Broadband Access System", Bell Labs Technical Journal, vol. 2, No. 2, Mar. 21, 1997, XP000695175, pp. 188–202.

Lee et al, "Routing Subject to Quality of Service Constraints in Integrated Communication Networks", IEEE Network: The Magazine of Computer Communications, vol. 9, No. 4, Jul. 1, 1995, XP000526591, pp. 46–55.

Rodriguez–Moral, "Libra—An Integrated Framework for Type of Service–Based Adaptive Routing in the Internet and Intranets", Bell Labs Technical Journal, vol. 2, No. 2, Mar. 21, 1997, XP000695169, pp. 42–67.

Marin et al, "Overview of the NBBS Architecture", IBM Systems Journal, vol. 34, No. 4, Sep. 21, 1995, XP000542400, pp. 564–588.

"Out of the Labs", tele.com, Jun. 1996, p. 18.

K. Struthers–Watson, et al., "Need Money? Your Wish Is My Command", *Communications International,* Jul. 1997, pp. 8–14.

*Primary Examiner*—Dung C. Dinh
*Assistant Examiner*—Abdullahi E. Salad
*Attorney, Agent, or Firm*—Nixon & Vanderhye, P.C.

[57] ABSTRACT

A network connection between an origination node (30-1) and a destination node (40) is dynamically determined and established during a tele/datacommunications session. At commencement of the session the originating node provides (i) an address of the destination node, and (ii) a set of prescribed quality connection parameters. During the session, the set of prescribed quality connection parameters is used by a quality connection server (20) to determine an acceptable sequence of links between the originating node and the destination node. In accordance with the determination, the quality connection server sets up connections over the acceptable sequence of links whereby data packets are transmitted between the originating node and the destination node during the session.

26 Claims, 10 Drawing Sheets

DYNAMIC QUALITY CONTROL NETWORK ROUTING

This patent application claims the benefit and priority of U.S. Provisional Patent Application Serial No. 60/049,778 filed Jun. 16, 1997, which is incorporated herein by reference.

BACKGROUND

1. Field of Invention

This invention pertains to tele/datacommunications networks, and particularly to obtaining quality connections over such networks.

2. Related Art and Other Considerations

The advent of the internet, also known as the world wide web (WWW), affords enhanced access to information. Today persons with internet-connected computers can communicate with other similarly connected computers. Some institutions maintain large computers which function as web servers for providing web pages to internet surfers. Transmissions in the form of data packets are routed between computers over links of the internet.

With increased popularity, the internet is becoming more crowded. For some links comprising the internet, delay times for packet transmission are considerably long. Similar phenomena afflicts other data networks, with the result that quality of connection is often degraded.

Various schemes have been developed to avoid congestion over a network. For example, U.S. Pat. No. 5,485,455 to Dobbins et al. discloses a fast packet switching network which determines a path between two nodes based upon "metrics". U.S. Pat. No. 5,029,164 to Goldstein discloses a network using ATM-type cells and which employs a bandwidth allocation scheme to avoid congestion. Neither of these schemes appear to involve a direct interface with a user, nor does there appear to be any express discussion of financial accounting or charging of the user for the requested quality of service.

U.S. Pat. No. 5,557,320 to Krebs discloses a sender-subscriber based, transmission traffic control system for video mail, which includes the transmission of bulk electronic data primarily in the form of still or motion picture images. The Krebs system schedules video mail transmissions in advance, not contemporaneously at the time of transmission.

What is needed therefore, and an object of the present invention, is dynamic optimization of quality assured connections when such quality service is requested.

SUMMARY

A network connection between an origination node and a destination node is dynamically determined and established during a tele/datacommunications session. At commencement of the session the originating node provides (i) an address of the destination node, and (ii) a set of prescribed quality connection parameters. During the session, the set of prescribed quality connection parameters is used by a quality connection server to determine an acceptable sequence of links between the originating node and the destination node. In accordance with the determination, the quality connection server sets up connections over the acceptable sequence of links whereby data packets are transmitted between the originating node and the destination node during the session.

The quality connection server determines the acceptable sequence of links by consulting a link current status database and/or sending solicitations for bids to a plurality of nodes intermediate the origination node and the destination node. Bids received in response to the solicitations are processed to determine the acceptable sequence of links. In one embodiment, prior to setting up the connections the server prompts the originating node for confirmation of the acceptable sequence of links.

The acceptable sequence of links can comprise links which constitute differing networks. For example, some of the links included in the acceptable sequence of links are links of a data network and others of the links included in the acceptable sequence of links are links of a public switched telephony network.

A billing system is utilized to bill customers for utilization of links.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 5 is a diagrammatic view showing the interrelationship of FIGS. 5A, 5B, 5C, and 5D.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
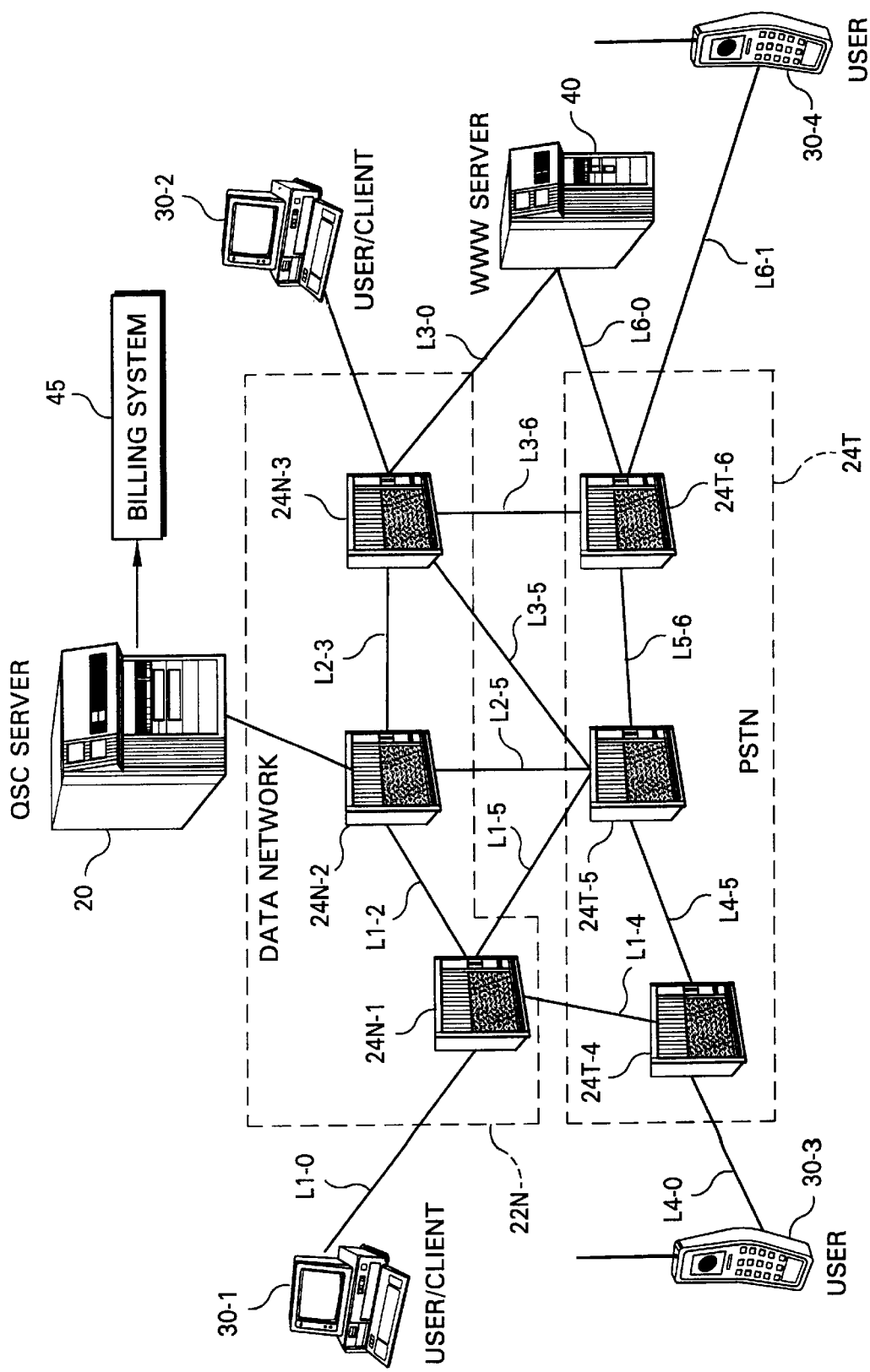
FIG. 1 is a schematic view showing a QSC server employed to ascertain and guarantee quality connections of links of various networks.

FIG. 1 shows a Quality of Service and Charging (QSC) Server 20 which is employed in the present invention to ascertain and reserve guaranteed quality connections over links of various networks. In the illustration of FIG. 1, QSC Server 20 has access to both data networks and public switched telephony networks (PSTN), as indicated by exemplary data network 22N and PSTN network 22T. Each network has a plurality of intermediate nodes or connection nodes, any of which are generically represented by reference numeral 24. Data network 22N includes a plurality of intermediate data nodes 24N-1, 24N-2, and 24N-3 which are generally packet-oriented, such as packet routers and packet switches. PSTN network 22T includes a plurality of intermediate telephony nodes 24T-4, 24T-5, and 24T-6, such as telephony switches.

Numerous end nodes in the form of computers or workstations are connected to data network 22N. For simplicity, only two such end nodes are shown in FIG. 1 as computers 30-1 and 30-2. Computer 30-1 is connected to node 24N-1; computer 30-2 is connected to node 24N-3. Similarly, other end nodes in the form of telephone sets utilized by telephone subscribers are connected to PSTN 24T, with FIG. 1 showing only two of such nodes as telephone sets 30-3 and 30-4. Telephone set 30-3 is connected to node 24T-4; telephone set 30-4 is connected to node 24T-6. Generically, reference numeral 30 represents any of the end nodes.

Communications links exist between various nodes. For example, and as shown in FIG. 1, node 24N-1 is connected to end node 30-1 by link L1-0, to node 24N-2 by link L1-2; to node 24T-4 by link L1-4; and to node 24T-5 by link L1-5. Each node 24N and node 24T is preferably connected to at least two other intermediate nodes.

An internet server, also known as world wide web ("WWW") Server 40, is shown in FIG. 1 as being an end node which is connected to data network 22N via node 24N-3 and to PSTN 22T by node 24T-6. Usage of internet servers to maintain e.g., web pages for organizations, such as businesses, governmental institutions or offices, etc., is well known.

A purpose of the present invention is dynamic optimization of quality assured connections between end nodes when quality service is requested by a node. As explained hereinafter in greater detail, QSC server 20 works together with nodes 24N/nodes 24T to ascertain and execute a quality routing plan when requested by an end node user. Further, in order to charge customers for its services and usage of the higher quality links, QSC server 20 periodically forwards billing information to billing system 45.

Figure 2:
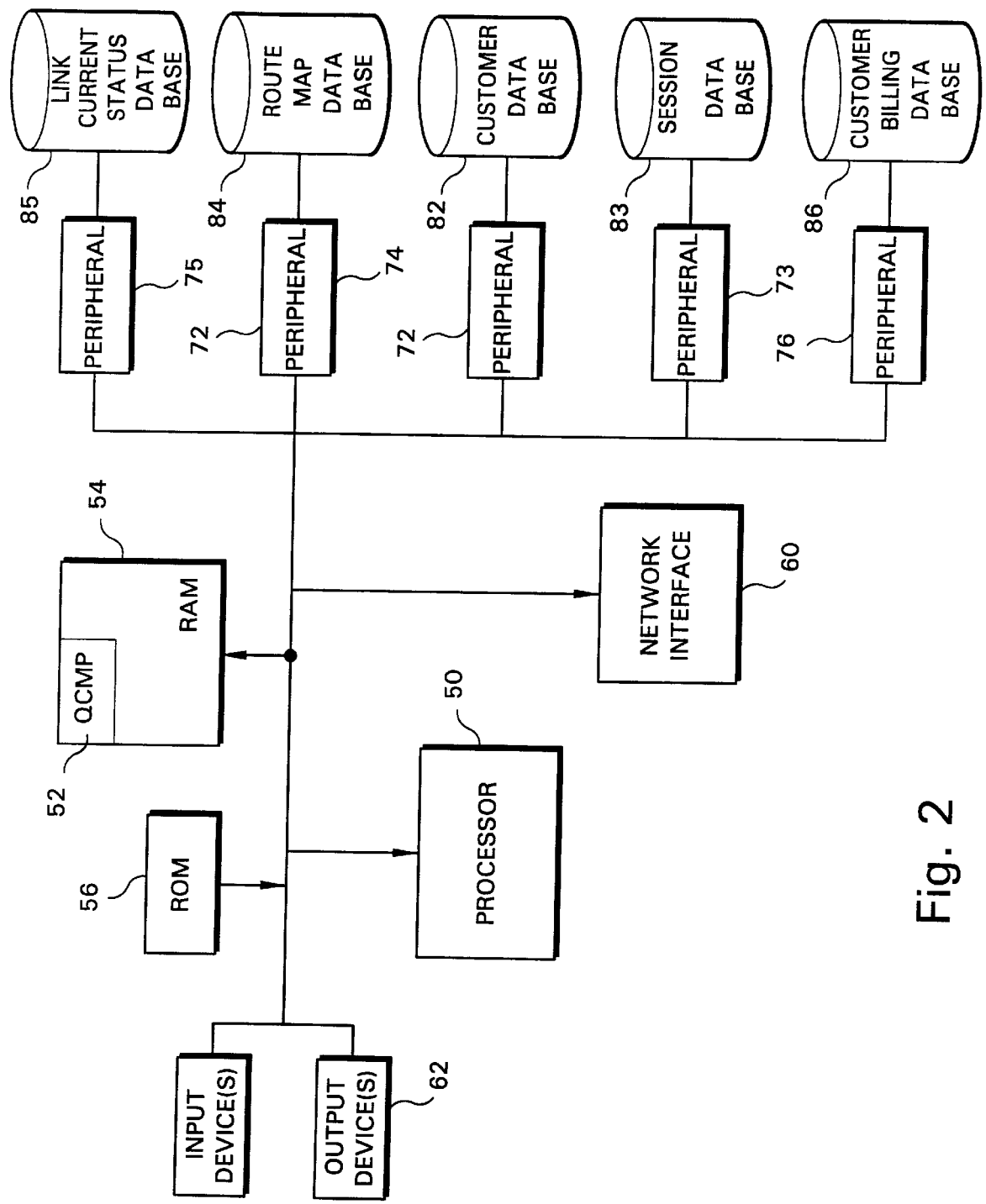
FIG. 2 is a schematic view of an embodiment of a QSC server according to the invention.

An example embodiment of QSC server 20 is shown in more detail in FIG. 2. In particular, QSC server 20 includes QSC processor 50 which executes a quality connection management program (QCMP) 52 stored in RAM 54, all under control of an operating system stored in ROM 56. QSC server 20 has input device(s) 60, e.g., keyboard/mouse, and output device(s) 62 [e.g., visible display unit, printer, etc.]. QSC server 20 is connected to data network 22N by network interface 70.

For the reasons explained hereinafter, QSC server 20 has access to several databases. In the particular embodiment of QSC server 20 shown in FIG. 2, each database is accessed via a dedicated peripheral device, such as a disk drive. For this embodiment, therefore, peripheral devices 72–76, are illustrated for respectively accessing the following databases: customer database 82, session or transaction database 83, route map database 84, link current status database 85, and customer billing database 86.

Figure 3:
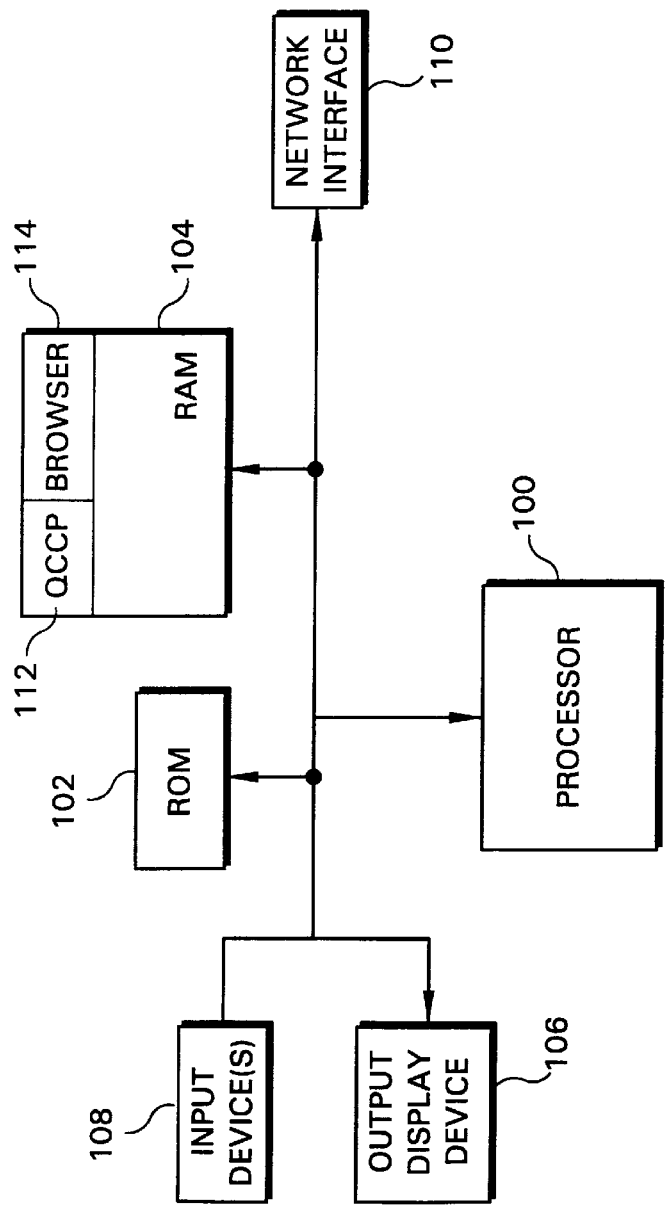
FIG. 3 is a schematic view of an end node in the form of a computer which access the QSC server of the invention.

An example end node in the form of a computer or workstation is shown in simplified manner in FIG. 3 as including a processor 100, a read only memory (ROM) 102, a random access memory (RAM) 104, an output display device (e.g., screen) 106, an input device(s) [e.g., keyboard and/or mouse] 108, and a modem or other network interface device 110. FIG. 3 does not shown numerous collateral features of the computer, e.g., drivers and interfaces.

Processor 100 executes a resident operating system, which in turn enables execution of various application programs stored in RAM 104. Two particular application programs stored in RAM 104 are pertinent to one or more embodiments of the present invention, specifically a quality connection client program (QCCP) 112 and an internet or web browser 114.

Figure 4:
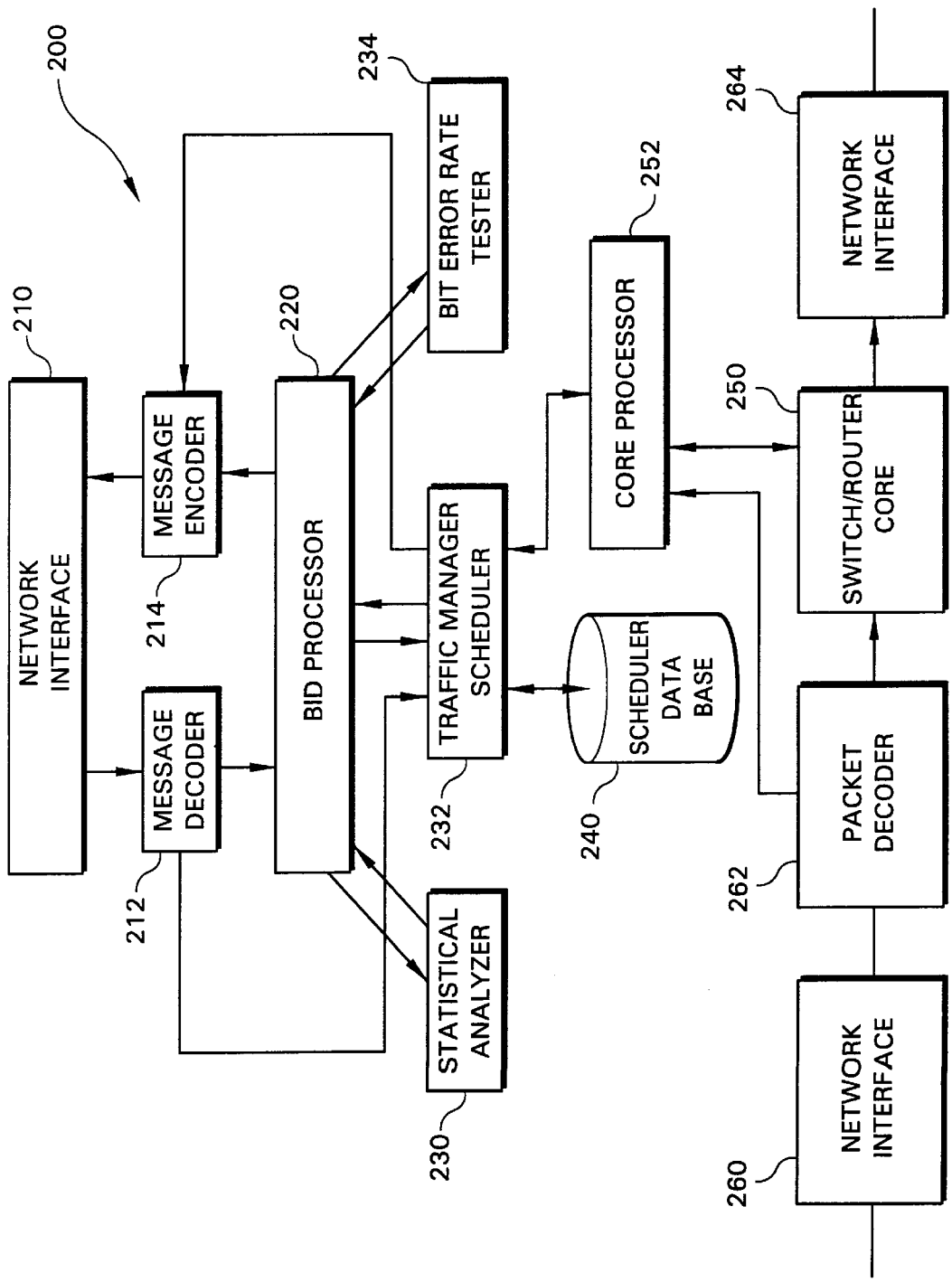
FIG. 4 is a schematic view of an intermediate node of a network which cooperates with the QSC server of the invention.
Figure 5A:
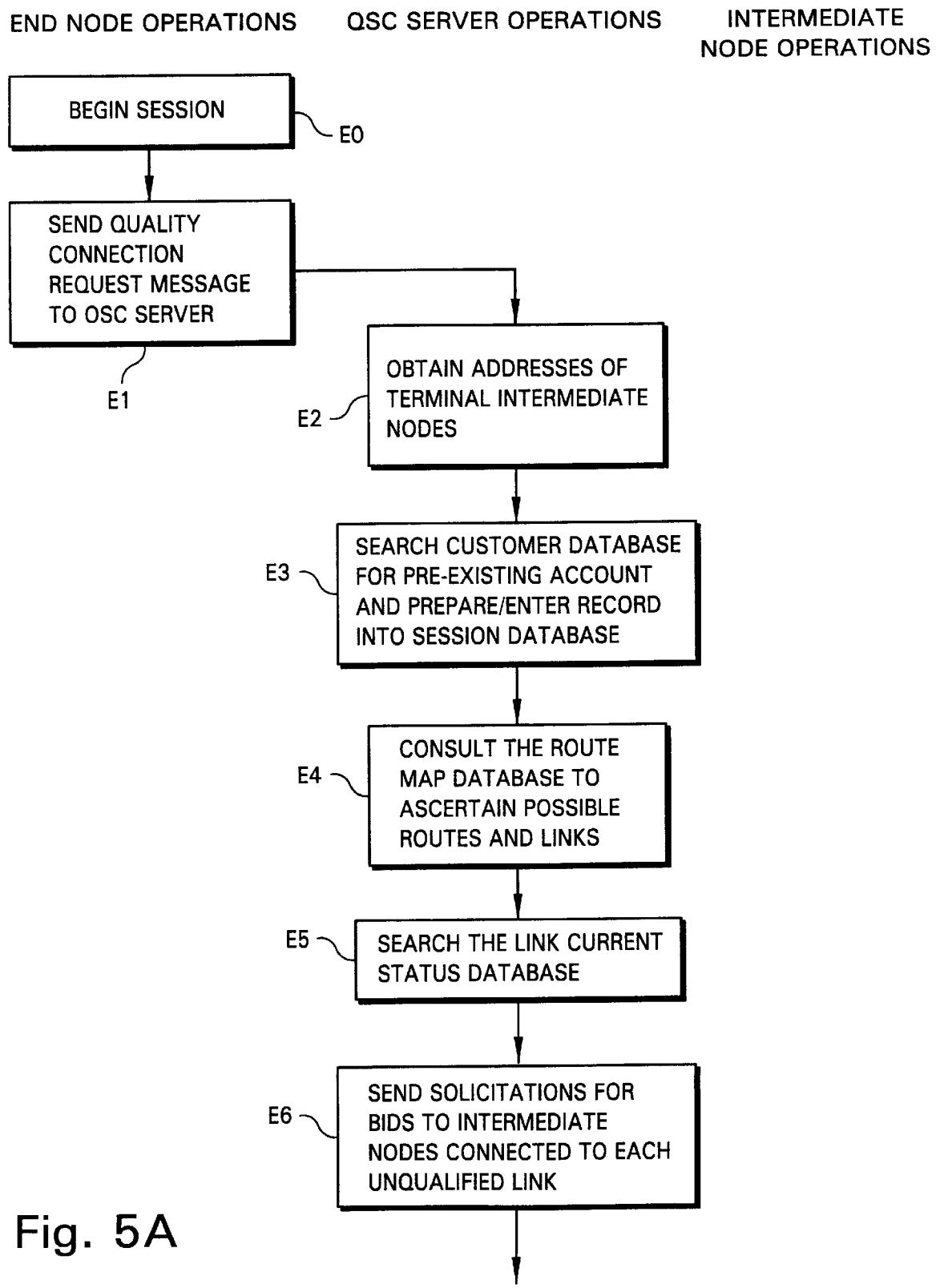
FIGS. 5A, 5B, 5C, and 5D are flowcharts showing events performed in ascertaining and guaranteeing quality connections in accordance with the present invention.
Figure 5B:
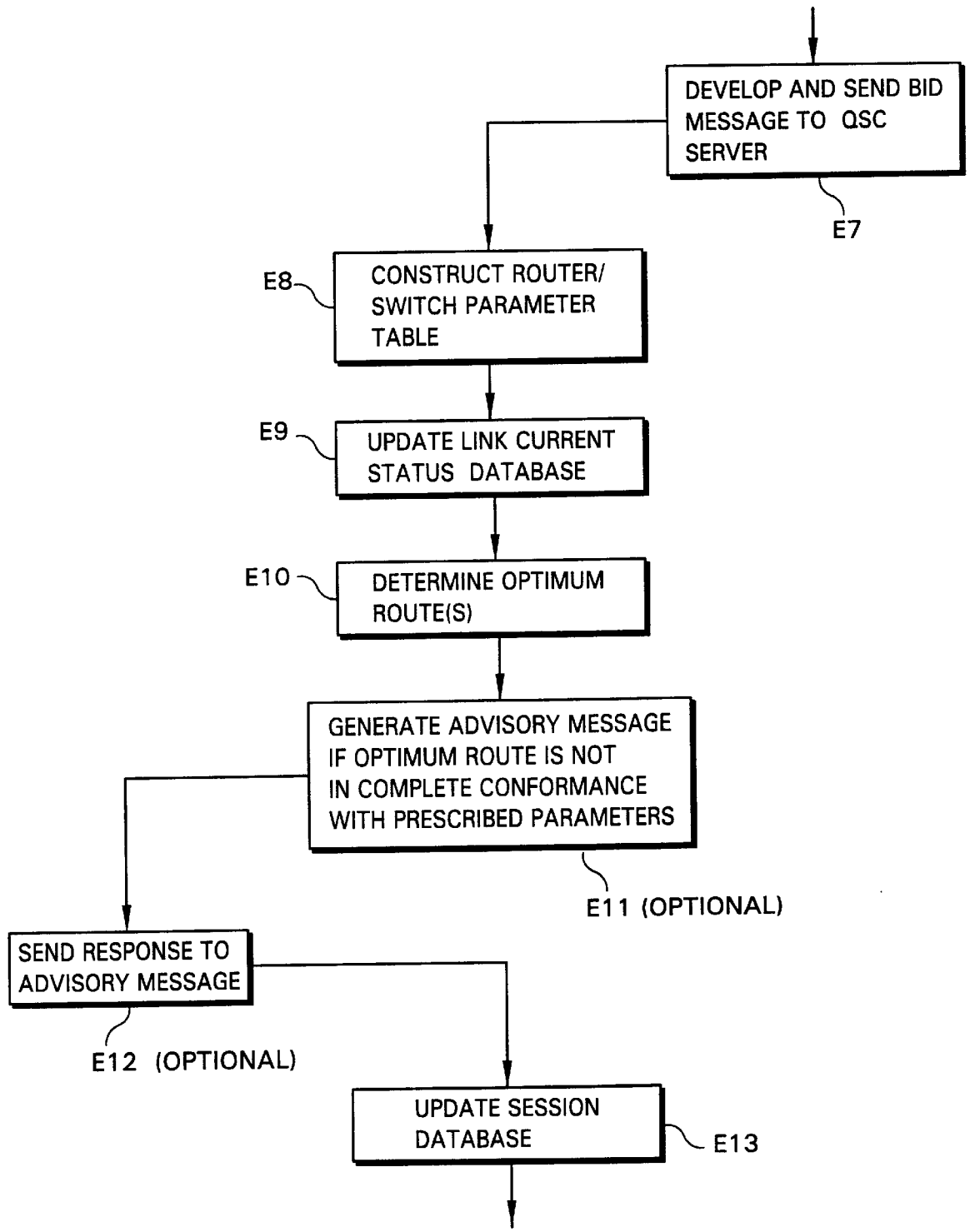
Figure 5C:
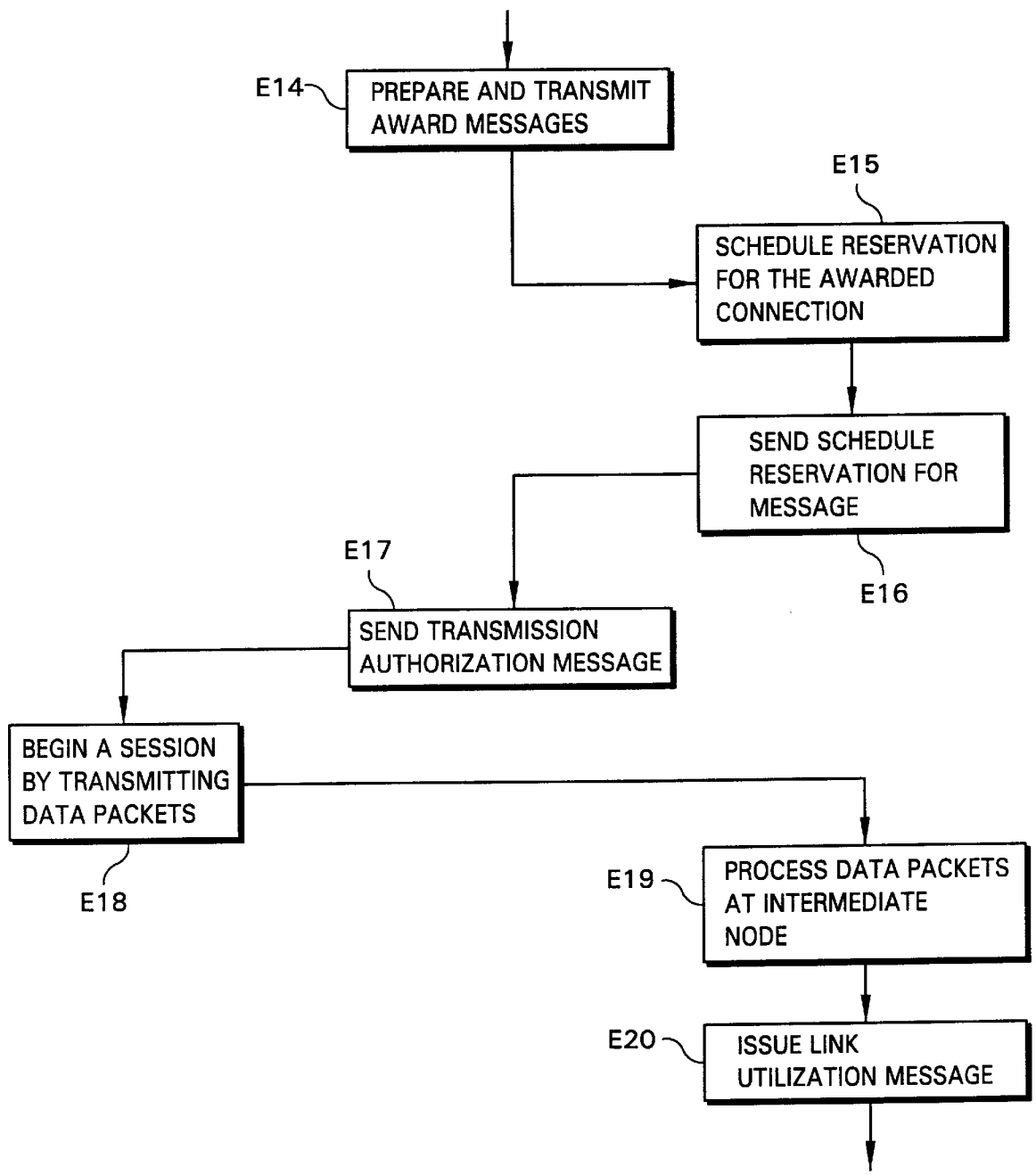
Figure 5D:
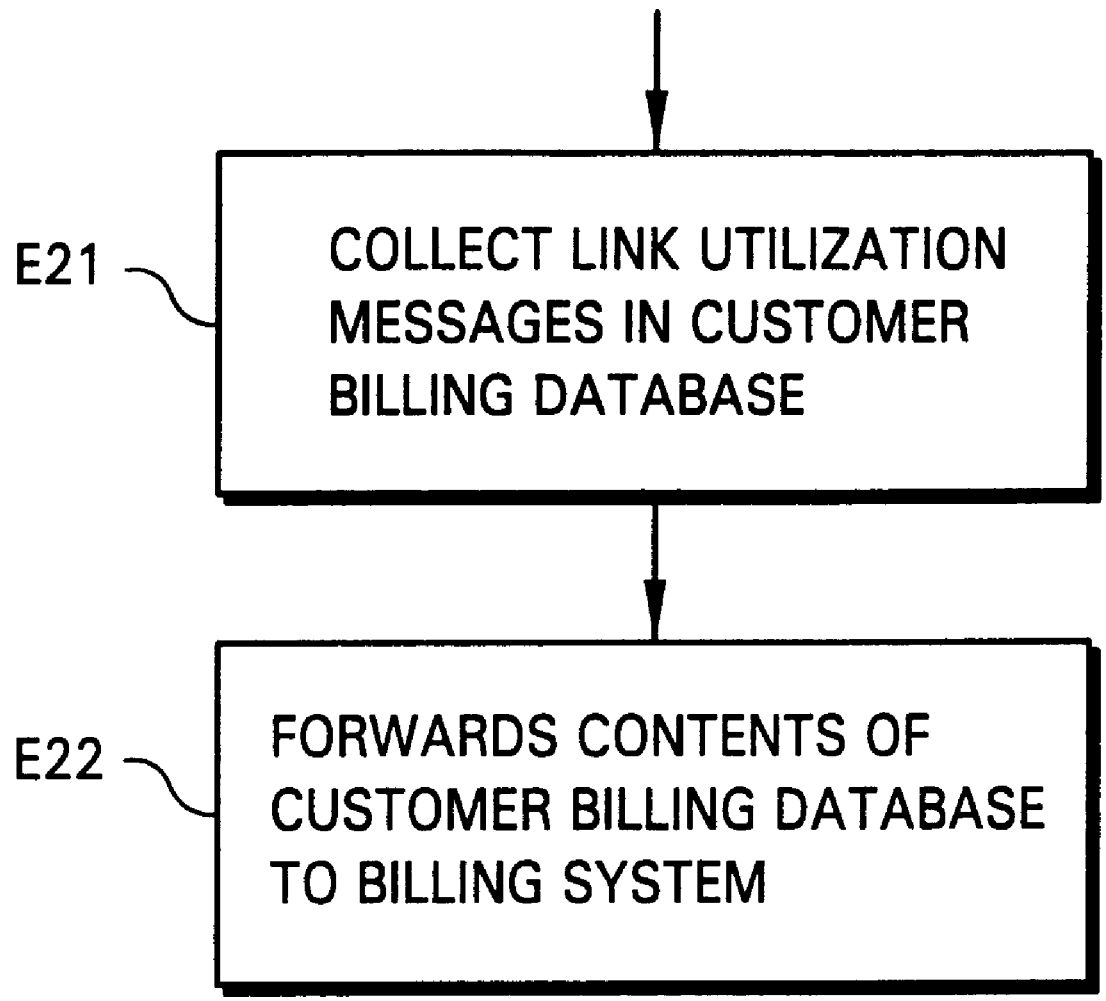

An intermediate node, such as a node 24N or a node 24T, has a configuration partially represented by FIG. 4. In particular, FIG. 4 shows portions 200 of an intermediate node involved with quality connection reservation and execution. An interface 210 is provided for connection to the network which communicates with QSC server 20. Connected to network interface 210 are a message decoder 212 and a message encoder 214. A bid processor 220 is connected to send inquiries to and receive responses from each of statistical analyzer 230, traffic manager/scheduler 232, and bit error rate tester 234. Traffic manager/scheduler 232 is connected to scheduler database 240.

An intermediate node typically has a core 250 which serves like a cross connect between input ports and output ports. Operation of the core 250 is controlled by core processor 252. Data packets incoming to the intermediate node are received at network interface 260, and are decoded at packet decoder 262. Based upon the contents of headers of the packets, core processor 252 sets up a cross connection in core 250 so that the packets are properly directed to an appropriate outgoing port and link via network interface 264. Network interfaces 260 and 264 can be of differing types, such as modems or ISDN interfaces for PSTN connections, and frame relay, ATM, X.25 for packet networks, for example.

In one embodiment of the invention, desired connection quality parameters regarding the connection(s) initiated by an end node are inputted in response to quality connection client program 112, thereby enabling the computer (and particularly quality connection client program 112) to communicate with QSC server 20 for setting up a quality connection when necessary. In another embodiment, loading of quality connection client program 112 at the end node is obviated by using a browser to contact QSC server 20 and, in response to a web page provided by QSC server 20, entering the desired connection quality parameters (along with the destination node address) directly to QSC server 20.

When installed, the quality connection client program 112 prompts the user to determine whether the program 112 is to be loaded into the auto_exec.bat file of the computer, e.g., so that program 112 is automatically executed upon every startup of the computer. If quality connection client program 112 is not included in the auto_exec.bat file of the computer, the user must specially activate program 112, e.g, "click on" the icon for program 112. Also upon installation, quality connection client program 112 prompts the user to enter (e.g., via keyboard) various default parameters regarding the quality of connection which the user desires.

In the embodiment which includes quality connection client program 112, a user has several options regarding mode of operation. Upon installation the quality connection client program 112 presents the user with an initial opportunity to select one of these modes of operation. These modes can be performed regardless of whether quality connection client program 112 is loaded in the auto_exec.bat file of the computer.

In a first mode of operation, the quality connection client program 112 automatically utilizes QSC server 20 (in the manner hereinafter described) whenever the user enters an internet address, thereby always obtaining connections consistent with the default parameters entered upon installation. In this mode of operation, the user also subsequently has the opportunity to revise or edit the default parameters, but nevertheless the QSC server 20 is always invoked for each internet connection without any notification of QSC server invocation being provided to the user.

In a second mode of operation, whenever a user types an internet destination address in conjunction with a browser program, e.g., browser 114, quality connection client program 112 generates a prompt to the user inquiring whether a quality connection is desired. If the user replies in the negative, browser 114 proceeds in conventional manner without consulting QSC server 20. On the other hand, if the user affirmatively indicates that the quality connection is desired, quality connection client program 112 displays the default parameters and prompts for permission to proceed to contact QSC server 20. Should the displayed default parameters not be suitable to the user, the user has the opportunity to edit the default parameters prior to providing permission to contact QSC server 20, so that QSC server 20 will utilize the edited rather than originally displayed parameters.

In a third mode of operation, known as the monitoring/solicitation mode, whenever a user types an internet destination address in conjunction with a browser program, e.g., browser 114, the connection is made in normal fashion without resort to QSC server 20. However, while the normal connection is effected, the user client software (quality connection client program (QCCP) 112) measures and monitors connection performance. Moreover, quality connection client program (QCCP) 112 transmits the extant normal connection parameters to QSC server 20, whereupon QSC server 20 explores, in the manner described herein, what better connections can be offered, so that QSC server 20 can ask if the users would like to pay to get better performance. For example, after connection client program (QCCP) 112 relays performance parameters to QSC server 20, and quality connection management program (QCMP) 52 at QSC server 20 ascertains that the connection parameters may be less than the user might desire, the quality connection management program (QCMP) 52 would issue commands to the user, i.e., end node 30-1 resulting in display of interactive messages with the user. The messages constitute a solicitation to employ the services of QSC server 20. For example, a first message displayed to the user might be as follows: "Is your connection slow? Why don't you take advantage of our special offer of 56 kbit/second guaranteed service for five minutes to get your file transfer quickly? only $5! After all, why did you get that fast modem, anyway?". By clicking on a positive solicitation response button on the solicitation screen, the client can invoke the guaranteed quality connection procedure as described herein. This third mode thus presents an opportunity for active automatic solicitations or sales of higher quality by the operators.

The default parameters mentioned above, which can subsequently be edited, include: a minimum bandwidth (MinBW); a maximum cost per minute (MaxCPM); a maximum delay per packet (MaxDPP); a maximum delay variation (MaxDV); a maximum error rate (MaxERR); and, a period (PERIOD) corresponding to an expected time duration or length of the connection. The minimum bandwidth (MinBW) is entered in units of kilobits per second; the maximum cost per minute (MaxCPM) is entered in a prearranged currency (e.g., US dollars per minute); the maximum delay per packet (MaxDPP) is entered in (tenths of) seconds; the maximum delay variation (MaxDV) is entered in (hundredths of) seconds; the maximum error rate (MaxERR) is entered in bits per million; and, the period is entered in minutes.

An example of operation of the invention is illustrated in a scenario in which the user of computer 30-1 desires to obtain quality connection to web server 40 (see FIG. 1). Events performed to obtain such quality connection are illustrated in FIG. 5.

At event E0, the user or customer at computer 30-1 begins a session by opening browser 114 and typing a the internet ("www") address of the destination node, i.e., www server 40. As used herein, "user session" is a unique set of data packets, identifiable by a unique combination of identifiers. A first example of unique combination of identifiers are unique session numbers occurring during a given time period in a special data header (protocol). A second example of unique combination of identifiers are a unique combination of source and destination IP-address plus port (application) numbers, one or more sequence number series during a given time period. A third example of unique combination of identifiers are all packets from a first specific IP address, e.g., 192-125.57.34, to a second specific IP-address, e.g., 64.72.89.23 on a particular date (e.g., May 12, 1997) and particular time period (e.g., 12.23.52 to 2.28.52, Greenwich Mean Time).

At event E1, quality connection client program (QCCP) 112 resident at computer 30-1, for reasons previously discussed, causes computer 30-1 to send a quality connection request message to QSC server 20. The quality connection request message includes not only the destination internet address (e.g., the address of the desired web server), but also the quality control parameters mentioned in the preceding paragraph.

As understood from FIG. 1, the quality connection request message is routed to QSC server 20 via nodes 24N-1 and 24N-2, QSC server 20 being connected to node 24N-2. The protocols which carry the quality request/answer messages (in itself a protocol on a higher level) can be http/IP, TCP/IP, IP or variants thereof, for example.

For the present illustrative example, it is assumed that computer 30-1 requires the following connection parameters: MinBW=64 kbit/sec; MaxCPM=$1 USD; MaxDPP=0.2 sec; MaxDV=0.01 sec; MaxERR=1 bit/million; PERIOD=10 minutes (or until a transaction is completed, such as a file transfer). The desired connection parameters can be initially inputted upon installation of the quality connection client program (QCCP) 112, and thereafter updated or edited as desired.

Upon receipt and deformatting of the quality connection request message, as event E2 QSC server 20 obtains the addresses of the calling end node (e.g., computer 30-1), the called end node or destination node (e.g., WWW server 30-2), and the terminal nodes of the desired connection. In the present example, the terminal nodes are node 24N-1 (to which computer 30-1 is connected) and either node 24N-3 or node 24T-6 (web server 40 being connected to both these nodes). The address of the calling end node and the called end node are obtained from the quality connection request message. The address of node 24N-1 is obtained either from the protocol by which the quality connection request message was delivered (via node 24N-1) to QSC server 20, or from customer database 82. The addresses of node 24N-3 is obtained by database lookup or by the protocol. The addresses of node 24T-6 is obtained by a "switch identity-telephone numbers database" lookup procedure.

"Obtained by the protocol", as employed herein, can involve QSC server 20 accessing a domain name server (DNS), or using a function/program commonly known as "trace". The trace function enables determination of an address of a node by sending packets to the end address and by setting an appropriate value in a "TimeToLive" parameter, the response to which is the IP address of the node in the route specified by the value set in the "TimeToLive" parameter.

As event E3, QSC server 20 searches its customer database 82 to determine whether the user has a pre-existing account. Assuming that the user has an account, at event E3 QSC server 20 also prepares and enters a record into session database 83. The record entered into session database 83 at event E3 includes the customer account number, a unique session or transaction number, the information gleaned at event E2, and the quality parameters specified by the calling computer. If the user of the calling computer does not have an account, QSC 20 can interactively elicit from the user sufficient information (e.g., billing address, credit card number, etc.) for establishing an account.

In the present example, the destination node, e.g., WWW server 40, is served by two terminal nodes, particularly nodes 24T-6 and 24N-6. Thus, QSC server 40 must research and investigate two potential connections, e.g., a first potential connection between nodes 24N-1 and 24N-3, and a second potential connection between nodes 24N-1 and 24T-6.

As event E4, QSC server 20 consults route map database 84 to ascertain all possible routes for each potential connection, and thus all possible links which can be used to connect the terminal nodes. An example organization for route map database 84 is in TABLE 1. TABLE 1 shows sequences of links which can be utilized to form connections between two terminal nodes. Route map database 84 includes each potential connection between two terminal intermediate nodes (illustrated by the first column of TABLE 1), and for each potential connection a listing of possible link sequences which conceivably could be utilized to achieve the potential connection between end nodes. As a result of event E4, for the present example QSC server 20 knows that it must check whether the criteria of the quality connection parameters can be fulfilled by the following links: L1-0, L1-2, L2-3, L2-5, L3-0, L3-5, L1-5, L5-6, L1-4, L4-5, and L6-0. It is assumed, for sake of present discussion, that link L1-0 and either link L3-0 or link L6-0 must be utilized regardless of connection quality. If such were not the case, e.g., if a plurality of links were provided between a terminal intermediate node and an end node, each of such links would be checked for connection quality in the manner hereinafter described with reference to other links.

In assessing connection quality, not only must the links between the two end nodes be taken into consideration, but also the capabilities of the end nodes themselves. In this regard, consideration must be given to each of the capabilities of the user end node (e.g., user's PC), the capabilities particular Internet connection to the user end node, the capabilities of the destination end node (i.e., the particular WWW-server being accessed), and the capabilities of the Internet connection to the destination end node. For example, the best capability of the server node must be ascertained, as by a bid from it, or measured by the quality connection client program (QCCP) 112 or tested by QSC Server 20, for criteria which are not additive. Examples of criteria which are not additive are throughput of connection in kilobit/second, in contrast to error rate and delay which are additive parameters. Since, of course, there is no point to having one link with a significantly greater feed (e.g., a 128 kbit/second feed) if the overall route must include a link with a much slower feed (e.g., a link with 28 kbit/second). Thus, capabilities of the destination node should be taken into consideration in the negotiation with the user for an acceptable solution, if the users original request is not possible to fulfill.

Also, as mentioned above, the equipment of the users at the user end node (e.g., the user's own PC and connection to internet) can also be a limiting factor, much in the same way as the destination node WWW-server described above. Therefore the user end node capability should also be taken into consideration, either by the quality connection client program (QCCP) 112 or by being tested by a node taking part in the total scheme, e.g. QSC Server 20. Should the parameters requested by the user be above the capabilities of his own end node equipment or his Internet connection, or of the destination node (e.g., the destination WWW-server) or it's connection to the Internet, the user would be informed and/or the request be automatically adjusted.

As stated above, QSC server 40 must check whether the links possibly utilizable to complete the desired potential connection can satisfy the quality connection requirement parameters specified by the calling end node. For many links, QSC server 40 will likely have to communicate, as described below, with an intermediate node to ascertain whether a link to which the intermediate node is connected can fulfill the quality connection requirement parameters. However, the QSC server 40 may have already reserved a certain amount of capacity/time over some links. In such pre-reservation scenario, e.g., occurring by a contract or like, QSC server 40 can commit to purchasing a predetermined amount of time/capacity over a network with predetermined contractual connection parameters. As long as the pre-reservation is still viable, and assuming that the desired connection parameters are encompassed within the predetermined (e.g., contractual) connection parameters, QSC server 40 may not need to communicate separately with intermediate nodes included in the pre-reservation for the purpose of parameter inquiry. Rather, the necessary information regarding parameters of the link can be ascertained by consulting the pre-reservation terms.

Similarly, for certain links it may be that QSC server 40 has recently received bids in response to solicitations from QSC server 40. If certain bids are indicated as being open until a time yet reached, QSC server 40 need not contact those bidding links in connection with the currently desired connection(s).

In the above regard, event E5 shows QSC server 40 searching the link current status database 85 (see FIG. 2) to determine if there is existing information for any of the possibly utilizable links. An example format for link current status database 85 is shown in TABLE 2. As it turns out for the present example, QSC server 20 has a contractual pre-reservation with PSTN network 22T, particularly covering link L4-5 and link L5-6. Therefore, for link L4-5 and link L5-6, link current status database 85 contains the pre-reservation connection parameters under the contractual agreement. In this regard, the second column of database 85 includes contractual connection parameters, and are accordingly suffixed with a "C". Other than the suffix, the names of the contractual connection parameters resemble those of the default connection parameters discussed earlier. For example, the minimum bandwidth for the contractual arrangement is MinBW-C.

In addition to pre-reservation contractual arrangements, as shown in TABLE 2 link current status database 85 also has an open bid regarding link L2-5. In this regard, the parameters for link L2-5 are suffixed with a "B". The bid from link L2-5 has not yet expired, and thus remains an option for selection by QSC server 20 should the parameters of the bid be acceptable. Links in link current status database 85 for which information is not presently available are marked as "N/A".

As it turns out in the present scenario, of the links for which extant parameters are known (e.g., for which parameters are entered in link current status database 85) only link L2-5 satisfies the connection quality parameters specified by computer 30-1. Such being the case, link L2-5 is labeled a "qualified" link. Links L4-5 and L5-6 meet all prescribed connection quality parameters except the cost per minute connection parameter. Non-satisfying links, and links for which information is not yet available, are referred to as "non-qualified" links.

In the present case, QSC server 20 cannot entirely form the connection using acceptable or qualified links within link current status database 85. Accordingly, as depicted by event E6, QSC server 20 sends solicitations for bids to intermediate nodes connected to each of the unqualified links listed in route map database 84 for the desired potential connection.

A solicitation for a bid sent by QSC server 20 as event E6 to an intermediate node 24 is essentially a message requesting confirmation that a connection of prescribed quality can be set up over the link administered by the node. The solicitation of event E6 is directed to one of the intermediate nodes administratively handling the link, the address of the intermediate node being included e.g., in a header of the message. Included in the solicitation for bid message are an identification of the link and the connection quality parameters specified by the calling computer, e.g., computer 30-1 in the present example. Solicitations for bid messages are sent to all potentially participating nodes for each potentially participating link, two end nodes per each link, as well as the route end node, the destination end node (e.g., the destination WWW-server), and the user end node (e.g., the user's PC). In the present example, solicitations are sent to User/Client node 30-1 (regarding its capabilities) and link L1-0, to node 24N-1 for links L1-0, L1-2, L1-4, L1-5, to node 24N-2 for links L2-3, L2-5, L1-2, to 24N-3 for links L3-0, L3-6, L2-3, L3-5, etc for intermediate nodes, and to destination node 40 40 for it's own capabilities as well as links L6-0 and L3-0.

In the above regard, in the internet currently, the number of links needed to get to any server usually is above 10 and under 30. To reduce the time of computation of the optimal route, rules to exclude some nodes may be used, e.g. connections from Sweden to Canada are always routed via the US, etc. The QSC server 20 may also send test packages via nodes close to the source node to the destination node to get the addresses of nodes involved in those routes, and determine a smaller set of nodes to request bids from based on that information. Another alternative is that the QSC Server builds a database of nodes and closeness to other nodes, such that only nodes relatively closer and closer to the end node are requested for bids.

Event E7 shows an intermediate node 24 receiving the solicitation message of event E6, and primarily developing and sending to QSC server 20 a bid message in response to the solicitation message. In event E7, the solicitation for bid message is received at interface 210 and decoded by message decoder 212. If message decoder 212 determines that the message is a solicitation for bid message, the message is transmitted to bid processor 220. Bid processor 220 functions to generate a bid message which is encoded by encoder 214 and forwarded to network interface 210 for transmission to QSC server 20.

The bid message developed by bid processor 220 includes the quality parameters which the intermediate node proffers for the solicited link. In determining these parameter for development of the bid message, bid processor 220 sends inquiries to each of statistical analyzer 230, traffic manager/scheduler 232, and bit error rate tester 234. Traffic manager/scheduler 232 is consulted to determine minimum bandwidth (MinBW-B) available on the link; a maximum cost per minute (MaxCPM-B) for the link; and the time for which any reservation on the link can be guaranteed or bid remain open (PERIOD). The statistical analyzer 230 is consulted to determine a maximum delay per packet (MaxDPP-B) on the link and a maximum delay variation (MaxDV-B) for the link. Bit error rate tester 234 is consulted to determine the maximum error rate (MaxERR-B) on the link.

For the present example, TABLE 3 shows the results of the bids received from event E7. From TABLE 3 it is seen that the bids returned by intermediate nodes 24T-4 and 24T-5 include no more favorable information than that which was earlier indicated for links L4-5 and L5-6, respectively, in link current status database 85 (see TABLE 2). That is, while meeting all other prescribed connection parameters, links L4-5 and L5-6 are still more expensive than the cost per minute required by the prescribed connection parameters.

Moreover, it is seen from TABLE 3 that link L2-3 is experiencing traffic to such a great extent that link L2-3 of data network 22N is not able to offer acceptable bandwidth or maximum delay per packet (MaxDPP) connection parameters. Link L1-2 of data network 22N is, on the other hand, able to satisfy all prescribed quality connection parameters. Link L1-5 also has unacceptable bandwidth and error (MaxERR) parameters.

Event E8 shows QSC server 20 constructing a connection parameter table. An example of a connection parameter table for the present illustrated example is shown in TABLE 4. In the present example, the first link (L1-0) and last link (either L3-0 or L6-0) of each potential connection meet all prescribed quality connection parameters. Such being the case, for sake of reducing the size of TABLE 4, parameters for links L1-0, L3-0, and L6-0 are not shown. However, it should be understood that, in actuality, each possible utilizable link of each potential connection has its connection parameter information assimilated into the connection parameter table. The connection parameter information for each link can be gleaned from a bid, or from the link current status database 85 in the manner described above (see TABLE 2). For example, the link parameter information included for links L1-2 and L2-3 are obtained from the bid messages returned from nodes 24N-1 and 24N-2, respectively.

In addition to constructing the connection parameter table (see TABLE 4), as event E9 QSC server 20 also can update the link current status database 85 (see TABLE 3). In this regard, for any bids which were specified as time open bids, the connection parameters for links associated with those bids can be stored in link current status database 85 until such time as the bids expire. QSC server 20 may also make regular or event-driven searches for better routes during the time the user application is active. If a better new route is found, the existing session/route is ended and a new session/route started.

At event E10, QSC server 20 uses the information stored in the connection parameter table (see TABLE 4) to determine dynamically (i.e., during the session) one or more acceptable (e.g., optimum) route(s) between the designated end nodes, e.g., between the calling end node and the destination end node. The acceptable route(s) can be determined with a suitable optimization method, such as linear programming or pattern searching (e.g., finding the acceptable routes by adaptive trials). In particular, in the illustrated embodiment QSC server 20 employs simplex-method linear programming. Such programming, which finds optimal routes using constraint equations, is understood from G. B. Dantzig, *Linear Programming and Extensions*, Princeton University Press, 1963.

What follows is an example of a set of six equations resulting from the prescribed quality connection parameter constraints imposed by the user of computer 30-1 on QSC server 20. The six equations are evaluated for i=1,n j=1,n, while i≠j, and wherein link(i,j) is the link between node i and node j, and "route" is a set of links (i,j) connecting the two end nodes.

| | |
|---|---|
| Capacity of Link(i,j)>=32 kbit/sec | Equation 1 |
| Sum Price(i,j) for route≦1.0 USD/min | Equation 2 |
| Sum Delay(i,j) for route≦0.2 seconds | Equation 3 |
| Sum Delay Variation(i,j) for route≦0.02 seconds | Equation 4 |
| Sum Error Rate for route(i,j)<10 bit/million bits | Equation 5 |
| Optimize cost (e.g., minimum cost) | Equation 6 |

This set of six equations is solvable by the linear programming technique, and provides the lowest cost alternative.

Figure 1A:
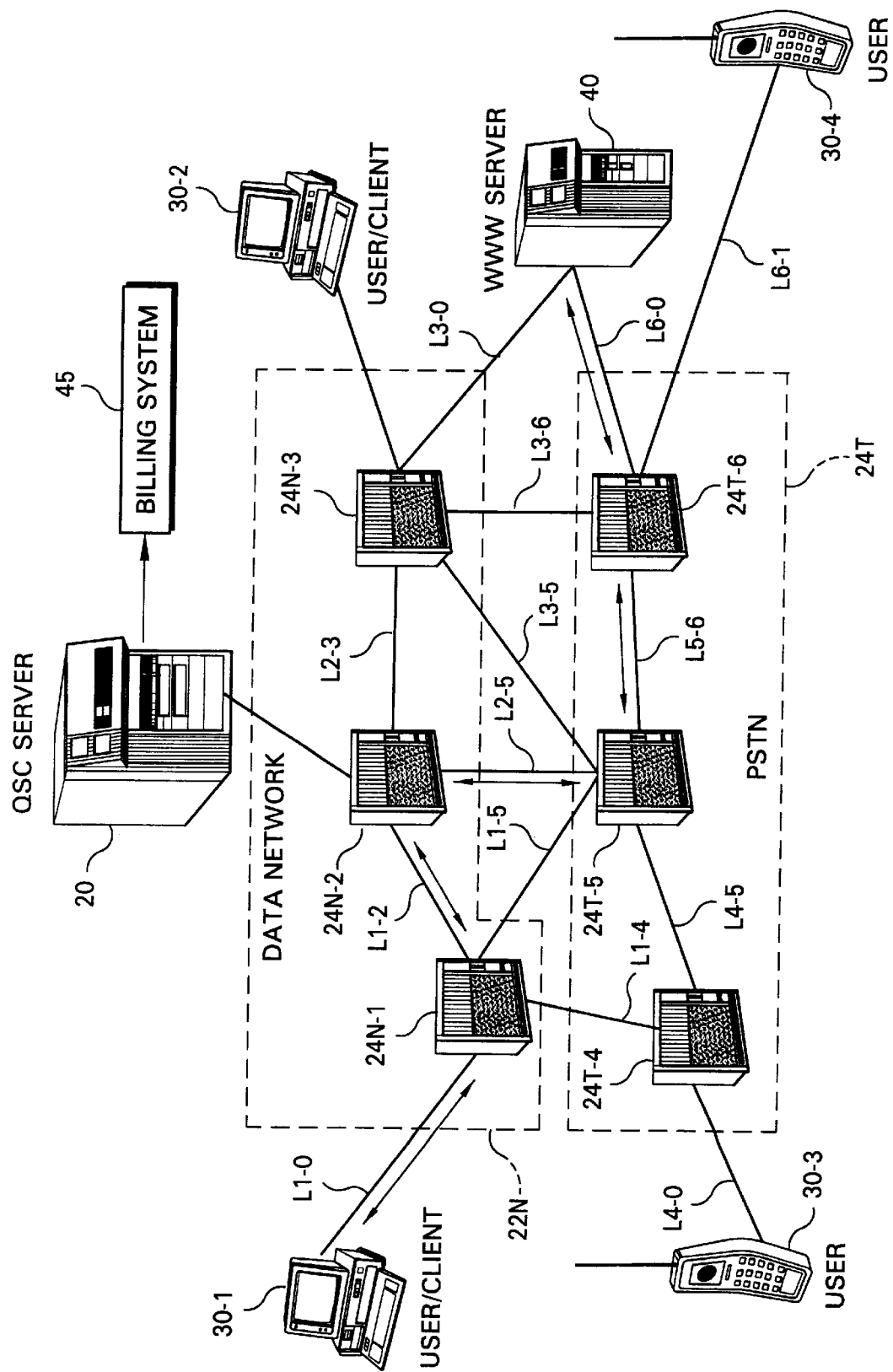
FIG. 1A is a schematic view showing a QSC server employed to route an internet connection through links of various networks.

Using the linear programming technique, QSC server 20 determines that none of the possible routes completely satisfies the quality connection parameters prescribed by calling computer 30-1. The route formed of link L1-0, L1-2 L2-3, and L3-0 does not meet the prescribed quality connection parameters in view of lack of bandwidth and delay on link L2-3. On the other hand, the route formed by links L1-0, L1-2, L2-5, L5-6, and L6-0 does meet all quality connection parameters except for cost per minute. The route formed by L1-0, L1-2, L2-5, L5-6, and L6-0 is indicated by double headed arrows in FIG. 1A.

In such case as that described above, QSC server 20 provides calling node 30-1 with an advisory message (event E11). The advisory message informs the customer that no route strictly satisfying the prescribed parameters is available, but also inquires whether the customer is agreeable to utilizing the acceptable quality but more expensive route negotiated by QSC server 20 (e.g., over L1-0, L1-2, L2-5, L5-6, and L6-0). The connection parameters of the acceptable quality but more expensive negotiated route are displayed, with the deviant parameter (price) being highlighted. In such message, calling node 30-1 is requested to confirm that the route negotiated by QSC server 20 is to be implemented despite the fact that the price therefor is greater than that of the prescribed parameters.

Event E12 shows the customer sending a response message to the advisory message of event E11. If response message of event E12 indicates that the user/customer is not agreeable to the route negotiated by QSC server 20, the customer can either terminate the session or edit the desired connection parameters. When the desired connection parameters are edited, processing returns to various steps described above (depending upon the extent and nature of edit). Otherwise (i.e., assuming the customer is agreeable to the negotiated route and the greater price), at event E13 QSC server 20 stores information regarding the links in the session record for the connection in session database 83.

At event E14 QSC server 20 prepares and transmits award messages to the intermediate nodes which successfully bid for the connection and which are to be included in the connection. The award messages include the session number, an identification of the link involved (e.g., the next node address), and the connection parameters upon which the award was based, including the PERIOD for which the link is to be reserved for the connection. For the terminal intermediate node, i.e., node 24T-6, the telephone number of the PSTN port of WWW server 40 is provided.

Event E15 shows an intermediate node 24 scheduling a reservation for the awarded connection. In pursuit of event E15, and as understood from FIG. 4, the award message received over network interface 210 is decoded by message decoder 212 and determined to be an award message. Such being the case, the award message is forwarded to traffic manager/scheduler 232. Traffic manager/scheduler 232 stores in scheduler database 240 a record which includes the above-mentioned contents of the award message. Then, as event E16, traffic manager/scheduler 232 prepares a schedule confirmation message which is encoded and sent from the intermediate node to QSC server 20.

Upon receipt of the schedule confirmation message, as event E17 the QSC server 20 sends a transmission authorization message to the calling end node, i.e., computer 30-1. The transmission authorization message includes the transaction or session number which QSC server 20 previously assigned to the transmission at event E3.

Receipt of the transmission authorization message from QSC server 20 permits the calling end node (i.e., computer 30-1) to continue the session by transmitting data packets to the terminal intermediate node to which it is connected (i.e., node 24N-1), as indicated by event 18. The quality connection client program 112 causes browser 114 to insert in each data packet the session number which was obtained from the transmission authorization message. In the first instance, for an internet connection the transmission basically includes data packets having the session number and the www address of the destination node.

Event 19 reflects processing by an intermediate node of the data packets originally transmitted from the calling end node. As understood with reference to FIG. 4, the data packets are received by the intermediate node at network interface 260 and are decoded at packet decoder 262. Headers of the data packets, which include the session number, are forwarded to core processor 252. Upon detecting the session number, core processor 252 contacts traffic manager/scheduler 232. Using the session number as an index, traffic manager/scheduler 232 searches scheduler database 240 and determines that a reservation exists for this session. Information of the award message content (including identification of the next node address and the connection parameters for the session), having been stored in database 240 at event E15, are fetched and transmitted by traffic manager/scheduler 232 to core processor 252. Using such information core processor 250 properly configures core 250 so that the data packets are forwarded to an appropriate port of the intermediate node.

In the example herein discussed, event E19 occurs first at intermediate node 24N-1 for forwarding the data packets to intermediate node 24N-2. Event E19 then also occurs at intermediate node 24N-2, so that the data packets can be forwarded to intermediate node 24T-5. Similarly, event E19 occurs at intermediate node 24T-5 so that the data packets can be forwarded to intermediate node 24T-6, whereat event E19 is similarly performed. In essence, the steps above-discussed with respect to FIG. 4 are applicable to any of the intermediate nodes included in such route. Upon receipt of the data packets by terminal intermediate node 24T-6, the data packets are routed to the PSTN port of the destination node, i.e., www server 40 in the present example.

Data packets which are transmitted from www server 40 back to the computer of end node 30-1 are directed so that they are routed via the same links as were the data packets from end node 30-1 to server 40. Whereas, for data packets on the forward path, the source IP address is the IP address of the user's PC 30-1 and the destination address is the IP address of the web server, for data packets on the return path the source IP address is the IP address of the web server 40 and the destination address is the IP address of the web server user's end node 30-1.

In the above regard, the data packets each can have a header which identifies the packets as belonging to a particular "user session". This means that the routers involved, including 24T-6, must interpret that header. Then, on the return path, either the WWW-server 40 inserts the header (and is thus one of the nodes communicating with QSC Server 20), or a router at the first terminal intermediate node (24T-6 for the return path) inserts the header. Alternatively, the packets can be uniquely identified by the combination of source IP-address, receiver IP-address (in e.g. IP-protocol/header), port number, sequence number (in e.g. TCP header/protocol). In accordance with such alternative, the routers must check and interpret this information within the TCP/IP headers. In either case, node 24T-6 gets the necessary information from the QSC server 20 that uniquely identifies the packets, and it has to look for these identifiers when determining what do to with in-coming packets. In the illustrated embodiment, all packets traveling between a first IP-address and a second IP address during a certain time period (or during a certain activity such as a file transfer of a certain file) are treated the same, and constitute the contracted user session.

As each data packet is transmitted (either from the user end node to the destination end node, or vise versa) through an intermediate node 24, in the illustrated embodiment the core processor 252 notes utilization of the outgoing link. At an appropriate time, traffic manager 232, as event E20, prepares a link utilization message. The link utilization message contains the session number, as well as the extent of utilization (time, capacity) of the link. The link utilization message is encoded by message encoder 214, and then transmitted via network interface 210 to QSC server 20.

The link utilization message of event E20 can be prepared at the end of a session, when an agreed upon period expires, when no data packets have arrived for an agreed time period, or as otherwise agreed. It should also be understood that the functions described above need not necessarily be performed by the processor and manager so stated, but that such functions can be performed by other elements as desired.

As event E21, QSC server 20 collects the link utilization messages from all intermediate nodes and organizes them by customer account number in customer billing database 86 (see FIG. 2). Upon receipt of a link utilization message, the session number is used as a search of the session database to obtain the session record. The session record also contains the customer account number for the customer who initiated the session, thereby enabling storing of the link utilization message by customer account number in customer billing database 86 or immediately after the user session is ended.

Periodically, e.g., at the end of a calendar day, QSC server 20 forwards the contents of customer billing database 86 to billing system 45, as indicated by event E22. Billing system 45 complies the received contents of customer billing database 86 into a larger database, also organized by customer account number, and periodically prepares consolidated invoices or bills which are addressed to the customers. Also, directly after the end of the user session, billing system 45 sends a message to the quality connection client program (QCCP) 112 which includes the cost of the user session, which cost amount can be displayed as desired to the customer (originating party). The invoices include the financial amount charged for utilization of the links as facilitated by the present invention.

Advantageously, events E0 through and including E19 shown in FIG. 5 are performed during a session, thereby assuring dynamic optimization of quality connections.

In the scenario described above, the quality connection is assured for data packets traveling both in the forward direction from the originating node to the destination node and in the return direction from the destination node to the originating node. However, the quality connection need not necessarily be utilized in both the forward and return direction. Rather, it may be that the quality connection client program (QCCP) 112 indicates to QSC server 20 that only in one direction is the quality connection required. Typically, if quality connection is required only in one direction, the required direction would be the return direction from web server 40 to the origination node.

In one embodiment, QSC server 20 is a SUN Enterprise 6000 computer, using a SUN ATM adapter and operating with a Solaris 2 UNIX operating system, TCP/IP communications software, a C++ compiler, and a Sybase database system. Software executed by QSC server 20 can be written in such embodiment in C++, Java, or other appropriate programming languages.

One example of an intermediate node is a Cisco Router with ATM interface connected to QSC server 20. An end node computer, such as computer 30-1, can be a personal computer (PC) which is connected to an internet service provider (using dial-up connection [SLIP/PPP software]) and running programs such as Netscape 3.0, Windows 95, and the ACCP program 112 hereinbefore described. Appropriate known protocols are prearranged between the intermediate nodes and QSC server 20.

Figure 1B:
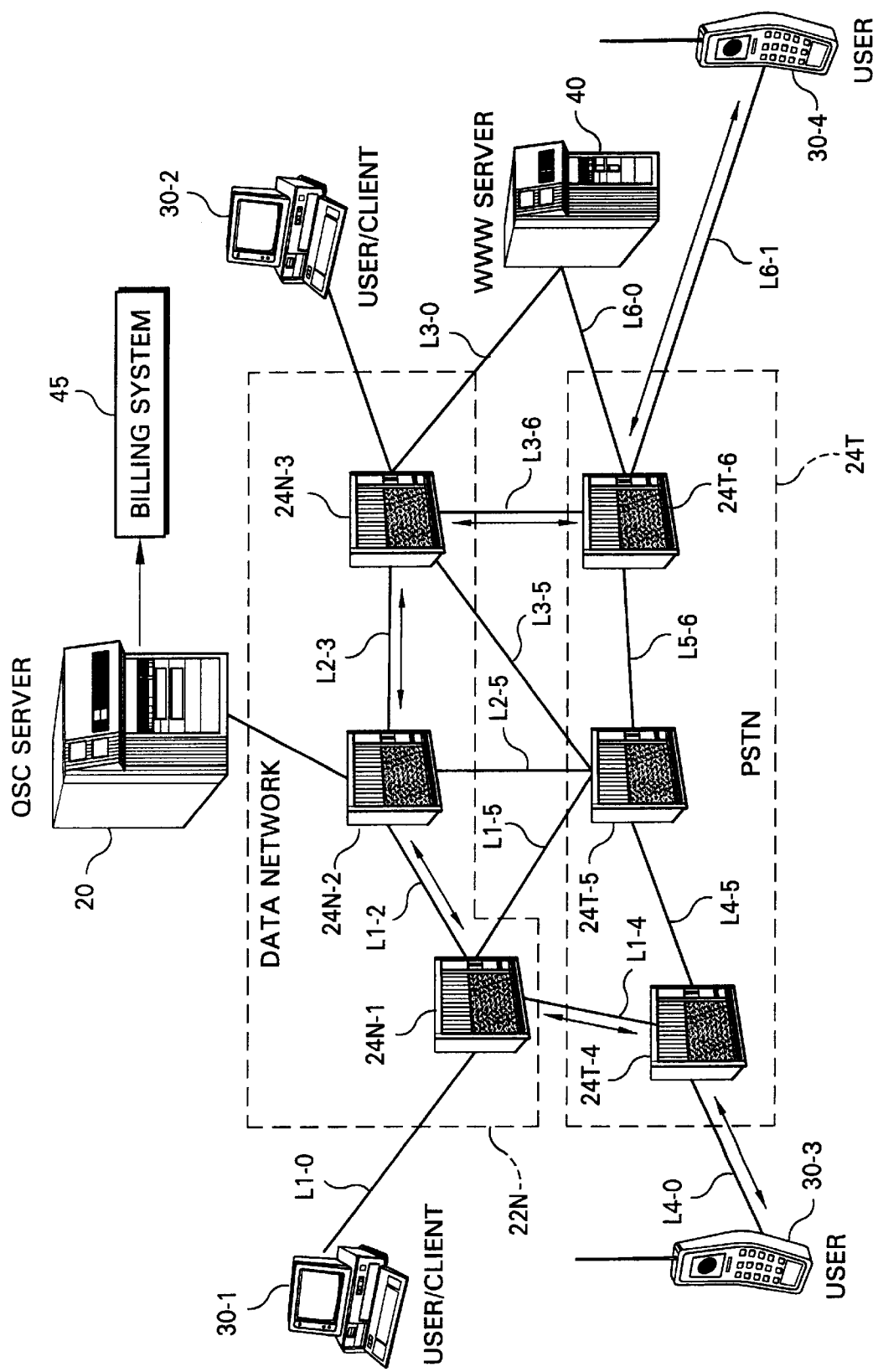
FIG. 1B is a schematic view showing a QSC server employed to route a telephone call through links of various networks.

Whereas the example described above illustrated an internet connection between an originating node (i.e., computer 30-1) and a destination node being routed by QSC server 20 partially over data network 22N and partially over PSTN network 22T, the converse is also feasible. As illustrated with respect to FIG. 1B, for example, telephone calls can be routed, at least in part, over links included in data network 22N.

In the above regard, when desiring to utilize services provided by QSC server 20, the customer/subscriber using telephone 30-3 can dial a telephone number for QSC server 20. Upon establishment of the connection between QSC server 20 and telephone 30-3, and verification of the customer's account (e.g., see event E3 of FIG. 5), QSC server 20 prompts the customer to enter the called party telephone number, e.g., the telephone number for party 30-4, for example.

In like manner as described above in connection with FIG. 1, QSC server 20 searches its link current status database 85 and, if necessary, sends solicitations for bids to various intermediate nodes. If it is determined that a suitable link of data network 22N is available in lieu of PSTN network 22T, and assuming that the links of data network 22N are cheaper than those of PSTN 22T, QSC server 20 selects such links of data network 22N. For example, in FIG. 1B, QSC server 20 could route the telephone call from the calling party at telephone 30-3 to the called party at telephone 30-4 via links L4-0, L1-4, L1-2, L2-3, L3-6, and L6-1. Assuming the links of the data network to be less expensive (if costing anything at all) than the links of PSTN 22T, such routing would be less expensive than utilizing links L4-5 and L5-6 as otherwise would be employed without QSC server 20.

If, in the scenario described above with respect to FIG. 1, it turns out that link L2-3 of data network 22N is congested, QSC server 20 could instead route the telephone call via links L4-0, L1-4, L1-2, L2-5, L5-6, and L6-1.

The present invention facilitates use of PSTN networks, such as PSTN network 24T shown in FIG. 1. In particular, nodes 24N are able to establish calls using modems or ISDN interfaces, such that upon instruction from QSC server 20 a node can forward data packets to a node with a telephone number rather than a network address. The telephone number is used by another node, which in turn is told by QSC server 20 that the packets will arrive on an identified PSTN link. Thus, for part of a total route, which may be congested in the data network, the packets may be transmitted over PSTN 24T. The nodes must be equipped with modems to convert the packet data stream into analogue signals to be sent through the PSTN, and back into data packets, or use ISDN interfaces.

QSC server 20 of the present invention takes into account any minimized delay variation requested by the customer. However, if bandwidth instead of delay variation is the more important, for applications such as large file transfer, QSC server 20 select several routes to get as high bandwidth as possible. Such depends on the nature of the application (e.g., large file transfer or not) and the capabilities of the software to handle delay variations (e.g., such as buffers in audio/video applications).

Variations of the structure and operation discussed above are understood to be within the scope of the present invention. For example, for sake of simplicity, databases 82–86 have been illustrated in FIG. 2 as accessed by QSC server 20 via peripheral devices. Alternatively, in an intelligent network environment, databases 82–86 can reside at one or more separate nodes, such as service data points (SDPs) of an intelligent network.

Further, in the example described above, information for development of bid messages was gleaned by intermediate nodes. Alternatively, rather than rely upon intermediate nodes for developing some or all of the connection parameters characterizing a particular link, QSC server 20 itself may initiate tests in order to ascertain the connection parameters. In this regard, QSC server 20 itself can calculate link connection parameters, such as delays and delay variation, by sending test messages between intermediate nodes, or by requesting that the intermediate nodes send test messages between one another and report the results to QSC server 20.

In the foregoing example, data packets transmitted between an originating node (e.g., calling node 30-1) and the destination node included the session number developed by QSC server 20. Using the session number, intermediate nodes perform searches of the scheduler database 240 in order to obtain additional information such as the address of the next node to which the packets should be forwarded. This simplifies and economizes data packet content, but requires further resources and operational steps at the intermediate nodes. In other embodiments, such additional information can also be provided to the originating node and included in the data packets.

While in the foregoing an example connection was discussed to web server 40, it should be understood that principles of the invention are applicable to connections for other types of destination nodes as well. Examples of such other destination nodes include mainframe computers, smaller (personal) computers, and telephone units.

In the foregoing discussion, illustration has been made of only one data network and one telephony network. It should be readily understood, however, that pluralities of such networks can be involved. Moreover, when several different networks are involved, contractual arrangements between the networks may be in effect. Further, the networks can be operated by different operators (e.g., differing telephone service providers, for example). QSC server 20 can be its own service provider, or can act as an assembler and reseller of capacity that other service providers (e.g., operators) lease or otherwise make available. Alternatively, QSC server 20 can be part of a network operator or service provider.

The QSC server 20 of the present invention need not necessarily be located at a single node or control point, but can instead be distributed or spread to a plurality of nodes or servers. For example, each of a plurality of such nodes or servers can be assigned specific domain or regional responsibilities. Alternatively, functions provided by QSC server 20 can be collocated with the intermediate nodes instead of at separate server nodes.

If a customer so requests, QSC server 20 can regularly poll potential other nodes to find better conditions. If better conditions are found, new links can be added and less desirable links deleted.

The preparation and transmission of bids from intermediate nodes can be coordinated by a company which owns a network of nodes in order to maximize profit within the constraints imposed by the call originator via QSC server 20. In this regard, bidding nodes can be connected to a Network Profit Optimization Server (NPOS) which attempts to maximize revenue resulting from use of the network. The NPOS has a database of available capacity and other characteristics of its nodes and the routes (links) between its nodes, such characteristics including the connection parameters of concern to QSC server 20 (e.g., speed, delay, delay variation, error rate, etc.). In addition, the NPOS database includes average cost (and marginal cost), average (and marginal) value estimates, already contracted capacity and quality, and forecasted demand as a function of price. The NPOS uses its database-stored information to determine bids from constituent nodes of the network which would comply with the connection parameters issued by QSC server 20 and also, consistent with those parameters, maximize revenue for the network operating company. For example, the NPOS can solve a set of linear equations using linear programming techniques or, when the equations are not linear, employ other suitable techniques such as those discussed above in connection with bid award by the QSC server 20.

While the invention has been particularly shown and described with reference to the preferred embodiments thereof, it will be understood by those skilled in the art that various alterations in form and detail may be made therein without departing from the spirit and scope of the invention.

TABLE 1

ROUTE MAP DATABASE

| Terminal Intermediate Nodes | Potential Routes |
|---|---|
| . . . | |
| . | |
| . | |
| . . . | |
| . | |
| 24N-1 ⇆ 24N-3 | L1-0, L1-2, L2-3, L3-0 |
| | L1-0, L1-2, L2-5, L3-5, L3-0 |
| | L1-0, L1-5, L3-5, L3-0 |
| | L1-0, L1-5, L2-5, L2-3, L3-0 |
| . . . | |
| . | |
| 24N-1 ⇆ 24T-6 | L1-0, L1-5, L5-6, L6-0 |
| | L1-0, L1-2, L2-5, L5-6, L6-0 |
| | L1-0, L1-4, L4-5, L5-6, L6-0 |
| . . . | |
| . | |
| . | |

TABLE 2

LINK CURRENT STATUS DATABASE
(Prior to solicitation for bids)

| link | current parameters | |
|---|---|---|
| L1-2 | N/A | |
| L1-4 | N/A | |
| L1-5 | N/A | |
| L2-3 | N/A | |
| L2-5 | MinBW-B = | 64 kbit/sec |
| | MaxCPM-B = | $1.00 USD |
| | MaxDPP-B = | 0.1 sec |
| | MaxDV-B = | 0.01 sec |
| | MaxERR-B = | 1 bit/million |
| L3-5 | N/A | |
| L3-6 | N/A | |
| L4-5 | MinBW-C = | 64 kbit/sec |
| | MaxCPM-C = | $1.30 USD |
| | MaxDPP-C = | 0.1 sec |
| | MaxDV-C = | 0.01 sec |
| | MaxERR-C = | 1 bit/million |
| L5-6 | MinBW-C = | 64 kbit/sec |
| | MaxCPM-C = | $1.30 USD |
| | MaxDPP-C = | 0.1 sec |
| | MaxDV-C = | 0.01 sec |
| | MaxERR-C = | 1 bit/million |

TABLE 3

LINK CURRENT STATUS DATABASE
(After receipt of bids)

| link | current parameters | |
|---|---|---|
| L1-0 | MinBW-B = | 64 kbit/sec |
| | MaxCPM-B = | $0.00 DSD |
| | MaxDPP-B = | 0.1 sec |
| | MaxDV-B = | 0.01 sec |
| | MaxERR-B = | 1 bit/million |
| L1-2 | MinBW-B = | 64 kbit/sec |
| | MaxCPM-B = | $0.00 USD |
| | MaxDPP-B = | 0.1 sec |
| | MaxDV-B = | 0.01 sec |
| | MaxERR-B = | 1 bit/million |
| L1-4 | MinBW = | 32 |
| | MaxCPM = | $0.90 |
| | MaxDPP = | 0.1 |
| | MaxDV = | 0.01 |
| | MaxERR = | 2 b/M |
| | PERIOD = | 10 min |
| L1-5 | MinBW = | 32 |
| | MaxCPM = | $0.90 |
| | MaxDPP = | 0.1 |
| | MaxDV = | 0.01 |
| | MaxERR = | 2 b/M |
| | PERIOD = | 10 min |
| L2-3 | MinBW-B = | 32 kbit/sec |
| | MaxCPM-B = | $0.00 USD |
| | MaxDPP-B = | 0.3 sec |
| | MaxDV-B = | 0.02 sec |
| | MaxERR-B = | 1 bit/million |
| L2-5 | MinBW-B = | 64 kbit/sec |
| | MaxCPM-B = | $1.00 USD |
| | MaxDPP-B = | 0.1 sec |
| | MaxDV-B = | 0.01 sec |
| | MaxERR-B = | 1 bit/million |
| L3-5 | MinBW = | 32 |
| | MaxCPM = | $0.90 |
| | MaxDPP = | 0.1 |
| | MaxDV = | 0.01 |
| | MaxERR = | 2 b/M |
| | PERIOD = | 10 min |
| L4-5 | MinBW-C = | 64 kbit/sec |
| | MaxCPM-C = | $1.30 USD |
| | MaxDPP-C = | 0.1 sec |
| | MaxDV-C = | 0.01 sec |
| | MaxERR-C = | 1 bit/million |
| L5-6 | MinBW-C = | 64 kbit/sec |
| | MaxCPM-C = | $1.30 USD |
| | MaxDPP-C = | 0.1 sec |
| | MaxDV-C = | 0.01 sec |
| | MaxERR-C = | 1 bit/million |
| L3-0 | MinBW-B = | 64 kbit/sec |
| | MaxCPM-B = | $0.00 USD |
| | MaxDPP-B = | 0.1 sec |
| | MaxDV-B = | 0.01 sec |
| | MaxERR-B = | 1 bit/million |
| L6-0 | MinBW-B = | 64 kbit/sec |
| | MaxCPM-B = | $1.30 USD |
| | MaxDPP-B = | 0.1 sec |
| | MaxDV-B = | 0.01 sec |
| | MaxERR-B = | 1 bit/million |

TABLE 4

CONNECTION PARAMETER TABLE

| Potential Routes | Parameters For Second Link | Parameters For Third Link | Parameters For Fourth Link | ... |
|---|---|---|---|---|
| L1-0, L1-2, L2-3, L3-0 | MinBW = 64<br>MaxCPM = $0.00<br>MaxDPP = 0.1<br>MaxDV = 0.01<br>MaxERR = 1 b/M<br>PERIOD = 10 min | MinBW = 32<br>MaxCPM = $0.00<br>MaxDPP = 0.3<br>MaxDV = 0.02<br>MaxERR = 1 b/M<br>PERIOD = 10 min | | |
| L1-0, L1-2, L2-5, L3-5, L3-0 | MinBW = 64<br>MaxCPM = $0.00<br>MaxDPP = 0.1<br>MaxDV = 0.01<br>MaxERR = 1 b/M<br>PERIOD = 10 min | MinBW = 64<br>MaxCPM = $1.00<br>MaxDPP = 0.1<br>MaxDV = 0.01<br>MaxERR = 1 b/M<br>PERIOD = 10 min | MinBW = 32<br>MaxCPM = $0.90<br>MaxDPP = 0.1<br>MaxDV = 0.01<br>MaxERR = 2 b/M<br>PERIOD = 10 min | |
| L1-0, L1-5, L3-5, L3-0 | MinBW = 32<br>MaxCPM = $0.90<br>MaxDPP = 0.1<br>MaxDV = 0.01<br>MaxERR = 2 b/M<br>PERIOD = 10 min | MinBW = 32<br>MaxCPM = $0.90<br>MaxDPP = 0.1<br>MaxDV = 0.01<br>MaxERR = 2 b/M<br>PERIOD = 10 min | | |
| L1-0, L1-5, L2-5, L2-3, L3-0 | MinBW = 32<br>MaxCPM = $0.90<br>MaxDPP = 0.1<br>MaxDV = 0.01<br>MaxERR = 2 b/M<br>PERIOD = 10 min | MinBW = 64<br>MaxCPM = $1.00<br>MaxDPP = 0.1<br>MaxDV = 0.01<br>MaxERR = 1 b/M<br>PERIOD = 10 min | MinBW = 32<br>MaxCPM = $0.00<br>MaxDPP = 0.3<br>MaxDV = 0.02<br>MaxERR = 1 b/M<br>PERIOD = 10 min | |
| L1-0, L1-5, L5-6, L6-0 | MinBW = 32<br>MaxCPM = $0.90<br>MaxDPP = 0.1<br>MaxDV = 0.01<br>MaxERR = 2 b/M<br>PERIOD = 10 min | MinBW = 64<br>MaxCPM = $1.30<br>MaxDPP = 0.1<br>MaxDV = 0.01<br>MaxERR = 1 b/M<br>PERIOD = 10 min | | |
| L1-0, L1-2, L2-5, L5-6, L6-0 | MinBW = 64<br>MaxCPM = $0.00<br>MaxDPP = 0.1<br>MaxDV = 0.01<br>MaxERR = 1 b/M<br>PERIOD = 10 min | MinBW = 64<br>MaxCPM = $1.00<br>MaxDPP = 0.1<br>MaxDV = 0.01<br>MaxERR = 1 b/M<br>PERIOD = 10 min | MinBW = 64<br>MaxCPM = $1.30<br>MaxDPP = 0.1<br>MaxDV = 0.01<br>MaxERR = 1 b/M<br>PERIOD = 10 min | |
| L1-0, L1-4, L4-5, L5-6, L6-0 | MinBW = 32<br>MaxCPM = $0.90<br>MaxDPP = 0.1<br>MaxDV = 0.01<br>MaxERR = 2 b/M<br>PERIOD = 10 min | MinBW = 64<br>MaxCPM = $1.30<br>MaxDPP = 0.1<br>MaxDV = 0.01<br>MaxERR = 1 b/M<br>PERIOD = 10 min | MinBW = 64<br>MaxCPM = $1.30<br>MaxDPP = 0.1<br>MaxDV = 0.01<br>MaxERR = 1 b/M<br>PERIOD = 10 min | |

The embodiments of the invention in which an exclusive property or privilege is claimed are defined as follows:

1. A method of establishing a network connection between an origination node and a destination node, the method comprising:

(1) obtaining from the originating node (i) an address of the destination node, and (ii) a set of prescribed quality connection parameters, at least the address of the destination node being obtained at commencement of a session:

(2) during the session, using the set of prescribed quality connection parameters to determine an acceptable sequence of links between the originating node and the destination node; and, in accordance with the determination, (3) setting up connections over the acceptable sequence of links whereby data packets are transmitted between the originating node and the destination node during the session;

wherein the acceptable sequence of links is determined by a server which performs the steps of:
   sending solicitations for bids to a plurality of nodes intermediate the origination node and the destination node;
   processing bids received in response to the solicitations to determine the acceptable sequence of links.

2. The method of claim 1, wherein the server also consults a link current status database to obtain predetermined quality connection parameters for a link.

3. The method of claim 1, wherein in processing the bids to determine the acceptable sequence of links the server also considers connection capabilities of the origination node and the destination node.

4. The method of claim 1, wherein a server uses the set of prescribed quality connection parameters to determine an acceptable sequence of links and sets up the connections over the acceptable sequence of links, but wherein prior to setting up the connections the server prompts the originating node for acceptance of the acceptable sequence of links.

5. A method of establishing a network connection between an origination node and a destination node, the method comprising:

(1) obtaining from the originating node (i) an address of the destination node, and (ii) a set of prescribed quality connection parameters, at least the address of the destination node being obtained at commencement of a session;

(2) during the session, using the set of prescribed quality connection parameters to determine an acceptable sequence of links between the originating node and the destination node; and, in accordance with the determination, (3) setting up connections over the acceptable sequence of links whereby data packets are transmitted between the originating node and the destination node during the session;

wherein the originating node has a processor which executes a client program, the client program including a set of instructions which upon installation prompts for entry of the set of prescribed quality connection parameters, and which upon entry of the address of the destination node causes the set of prescribed quality connection parameters to be sent to a server, the server performing steps (2) and (3).

6. The method of claim 1, wherein the acceptable sequence of links comprises links which constitute differing networks.

7. The method of claim 6, wherein some of the links included in the acceptable sequence of links are links of a data network and others of the links included in the acceptable sequence of links are links of a public switched telephony network.

8. A method of establishing a network connection between an origination node and a destination node using links of a network, the method comprising:

(1) obtaining from the originating node (i) an address of the destination node, and (ii) a set of prescribed quality connection parameters, at least the address of the destination node being obtained at commencement of a session;

(2) during the session, using the set of prescribed quality connection parameters to determine an acceptable sequence of links between the originating node and the destination node; and, in accordance with the determination, (3) setting up connections over the acceptable sequence of links whereby data packets are transmitted between the originating node and the destination node during the session;

wherein the originating node has a processor which executes a client program, the client program including a set of instructions which, upon entry of the address of the destination node, sends a message to a server which performs steps (2) and (3), and wherein prior to performing steps (2) and (3) the server requests entry of the set of prescribed quality connection parameters from the origination node;

wherein the message is sent to the server over a link of the same network through which the connection is to be established.

9. A method of establishing a network connection between an origination node and a destination node, the method comprising:

(1) obtaining from the originating node (i) an address of the destination node, and (ii) a set of prescribed quality connection parameters, at least the address of the destination node being obtained at commencement of a session;

(2) during the session, using the set of prescribed quality connection parameters to determine an acceptable sequence of links between the originating node and the destination node; and, in accordance with the determination, (3) setting up connections over the acceptable sequence of links whereby data packets are transmitted between the originating node and the destination node during the session;

wherein the originating node has a processor which executes a client program, the client program including a set of instructions which, after a connection is made with the destination node without utilization of the client program, monitors a parameter of the connection with the destination node and transmits the parameter of the connection to a server which develops a proposal for a quality connection between the originating node and the destination node and which returns the proposal to the client program whereby the client program generates a solicitation for utilization of the quality connection.

10. A computer program product including a set of instructions stored in a memory for execution by a processor of a computer which serves as an originating node of a network, the set of instructions when executing performing the functions of:

prompting entry of a set of prescribed quality connection parameters;

sending a quality connection request message, when an address of a destination node of the network is entered during execution of an internet browser program, to a quality connection server node, the quality connection request message requesting that the quality connection server node use the set of prescribed quality connection parameters to determine an acceptable sequence of links between the originating node and the destination node; and refraining from transmitting data packets to the destination node until the quality connection server node has determined and reserved the acceptable sequence of links between the originating node and the destination node.

11. The computer program product of claim 10, wherein the set of prescribed quality connection parameters is included in the quality connection request message.

12. A quality connection server node for a tele/datacommunications network, the node including a memory wherein a quality connection management program is stored, the quality connection management program including a set of instructions which are executed by a processor of a server node for performing the functions of:

(1) during a tele/datacommunications session, using a set of prescribed quality connection parameters to determine an acceptable sequence of links between a session-originating node and a destination node; and, in accordance with the determination, (2) setting up connections over the acceptable sequence of links whereby data packets are transmitted between the session-originating node and the destination node during the session;

wherein the function of using a set of prescribed quality connection parameters to determine an acceptable sequence of links includes the steps of:

sending solicitations for bids to a plurality of nodes intermediate the session-origination node and the destination node;

processing bids received in response to the solicitations to determine the acceptable sequence of links.

13. The method of claim 12, wherein the server node also consults a link current status database to obtain predetermined quality connection parameters for a link.

14. The quality connection server node of claim 12, wherein the function of setting up connections over the acceptable sequence of links includes the step of transmitting a session number and session reservation information to nodes intermediate the session-origination node and the destination node which are included in the acceptable sequence of links.

15. The quality connection server node of claim 12, wherein the acceptable sequence of links comprises links which constitute differing networks.

16. The quality connection server node of claim 12, wherein some of the links included in the acceptable sequence of links are links of a data network and others of the links included in the acceptable sequence of links are links of a public switched telephony network.

17. A computer program product including a set of instructions stored in a memory for execution by a processor of a computer which serves as an originating node of a network, the set of instructions when executing performing the functions of:

monitoring a parameter of a connection between the originating node and a destination node after a connection is made between the originating node and the destination node;

transmitting the parameter of the connection to a server;

receiving from the server a proposal for a quality connection between the originating node and the destination node; and generating a solicitation message at the origination node for utilization of the quality connection.

18. A method of operating a multi-node network having one or more nodes which receive a solicitation from a server, the solicitation including a set of prescribed connection parameters sought for characterizing links to be included in an acceptable sequence of links between an extra-network origination node and an extra-network destination node, the method comprising:

in response to the solicitation, determining which links between the nodes of the network satisfy the prescribed connection parameters; and apprising the server of ones of the satisfying links for which utilization would maximize revenue for network.

19. A method of establishing a network connection between an origination node and a destination node, the method comprising:

(1) obtaining from the originating node (i) an address of the destination node, and (ii) a set of prescribed quality connection parameters, at least the address of the destination node being obtained at commencement of a session;

(2) during the session, using the set of prescribed quality connection parameters to determine an acceptable sequence of links between the originating node and the destination node that allows transmission compliant with the prescribed quality connection parameters; and, in accordance with the determination;

(3) setting up connections over the acceptable sequence of links whereby data packets are transmitted between the originating node and the destination node during the session;

characterized in that step (2) is performed prior to step (3), and that step (2) comprises:

sending solicitation messages, at commencement of the session, to a plurality of nodes intermediate the origination node and the destination node, the solicitation message requesting confirmation that a connection of the prescribed quality can be set up over a link administered by the intermediate nodes;

processing bid messages received in response to the solicitations to determine the acceptable sequence of links.

20. The method of claim 19, wherein at least one of the bid messages provides confirmation that a connection of the prescribed quality can be set up over a specified link until a time yet reached.

21. The method of claim 19, further comprising sending award messages which cause the intermediate nodes which sent accepted bid messages to schedule a reservation for the session.

22. The method of claim 19, wherein step (2) is performed by a server which determines the acceptable sequence of links in a manner both to satisfy the set of prescribed quality connection parameters and to maximize revenue obtained from the session.

23. A quality connection server node for a communications network, the node including a memory wherein a quality connection management program is stored, the quality connection management program including a set of instructions which are executed by a processor of the server node for performing the functions of:

(1) during a communications session, using a set of prescribed quality connection parameters to determine an acceptable sequence of links between a session-originating node and a destination node that allows transmission compliant with the prescribed quality connection parameters; and, in accordance with the determination, (2) setting up connections over the acceptable sequence of links whereby data packets are transmitted between the session-originating node and the destination node during the session;

characterized in that function (1) is performed prior to function (2), and that function (1) comprises:

sending solicitation messages, at commencement of a session, to a plurality of nodes intermediate the origination node and the destination node, the solicitation message requesting confirmation that a connection of the prescribed quality can be set up over a link administered by the intermediate nodes;

processing bid messages received in response to the solicitations to determine the acceptable sequence of links.

24. A quality connection server node of claim 23, wherein at least one of the bid messages provides confirmation that a connection of the prescribed quality can be set up over a specified link until a time yet reached.

25. The quality connection server node of claim 23, wherein in performing function (1) the server node determines the acceptable sequence of links in a manner both to satisfy the set of prescribed quality connection parameters and to maximize revenue obtained from the session.

26. The quality connection server node of claim 23, wherein the server node performs the further function of sending award messages which cause the nodes which sent accepted bid messages to schedule a reservation for the session.

* * * * *